F. HARDY.
NUT LOCK.
APPLICATION FILED FEB. 24, 1910.
978,021.
Patented Dec. 6, 1910.
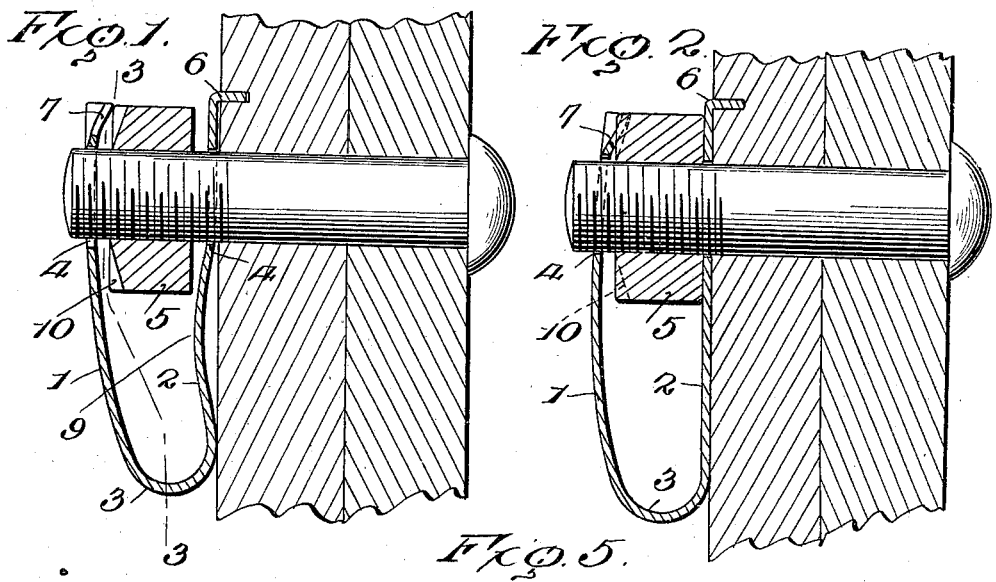
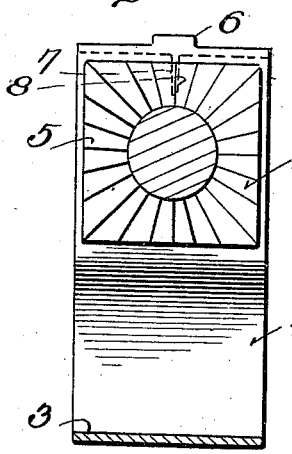
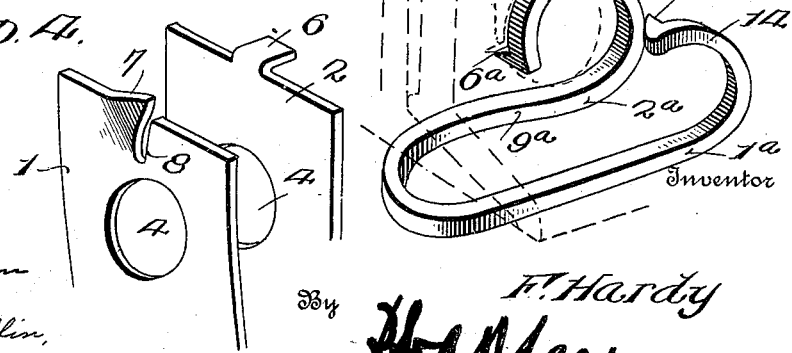
Witnesses
Inventor
F. Hardy
By Attorneys.

UNITED STATES PATENT OFFICE.

FREDERICK HARDY, OF COLUMBIA, TENNESSEE.

NUT-LOCK.

978,021.  Specification of Letters Patent.  Patented Dec. 6, 1910.

Application filed February 24, 1910. Serial No. 545,680.

*To all whom it may concern:*

Be it known that I, FREDERICK HARDY, a citizen of the United States, residing at Columbia, in the county of Maury and State of Tennessee, have invented certain new and useful Improvements in Nut-Locks, of which the following is a specification.

The primary object of this invention is an improved construction of nut lock, which will be cheap to manufacture, easy to apply, and remove when necessary and convenient in operation to positively prevent the nut from becoming accidentally loosened.

With these and other objects in view the invention consists in certain constructions, arrangements and combinations of the parts that I shall hereinafter fully describe and claim.

For a full understanding of the invention, reference is to be had to the following description and accompanying drawings in which;

Figure 1 is a transverse sectional view of one form of my improved nut lock illustrating the parts before the nut has been fully screwed up; Fig. 2 is a transverse sectional view with the nut lock in fully operative position; Fig. 3 is a transverse sectional view on the line 3—3 of Fig. 1; Fig. 4 is a detail perspective view of a portion of that form of the invention which is illustrated in Figs. 1, 2, and 3. Fig. 5 is a top plan view of another embodiment of the invention; and, Fig. 6 is a perspective view of that form of nut lock which is illustrated as applied in Fig. 5.

Corresponding and like parts are referred to in the following description and indicated in all the views of the accompanying drawing by the same reference characters.

In that form of the invention illustrated in Fig. 1, my improved nut lock comprises a spring clip which embodies two substantially parallel members 1 and 2 which are preferably integrally connected at one end as indicated at 3, the said clip being preferably constructed out of a single strip of spring sheet metal doubled upon itself as clearly indicated in the drawing. Each member of the clip is formed with an opening for the bolt, the said openings registering and being designated 4. The clip is designed to receive the nut 5 between the members 1 and 2. In order to prevent the clip from turning and thereby also permitting the nut to turn after being secured thereto the member 2 in the embodiment of the invention now being described is formed at one end with a laterally projected lug 6 which is designed to be embedded in the substructure if the latter be of wood, or to be received in an opening formed for it if of metal and through which the bolt extends. The member 1 of the clip is formed at one end with a locking tooth 7 which in the present instance is formed by splitting this end of the clip and deflecting one of the parts at one side of the split or slot 8. It is to be particularly noted that that part of the member 2 adjacent to the connecting member 3 is normally bowed outwardly as indicated at 9. This bowed formation subserves a double function. That is to say, the bowed structure permits the locking tooth 7 to assume a position out of engagement with the preferably beveled teeth 10 that are formed on the outer face of the nut 5 so as to prevent the dulling or blunting of the tooth, while at the same time permits the nut to be more easily turned, as it is worked on the bolt, while after the nut has been worked up to the limit of its movement on the threaded portion of the bolt, it will flatten out the bowed portion 9 and thereby serve to not only brace the parts but to also bring the tooth 7 into engagement with the teeth 10 of the nut so as to securely prevent the unscrewing of the latter.

It is to be understood that my invention is not limited to the exact form, construction arrangement and proportion of parts herein shown and described, or to that form illustrated in Fig. 1, as various changes may be made without departing from the scope of the invention as defined in the appended claims. For example, reference is to be had to Fig. 5 wherein is illustrated the invention as embodied in a clip designed particularly for use in track or rail work. In this form of the device, the clip is preferably constructed out of a strong, spring bar metal as an outer member 1$^a$ and an inner member 2$^a$ extending parallel thereto, and being preferably coiled upon itself at one end as indicated at 11 to partially or entirely encircle the bolt, and being formed at its extremity with a lug 6$^a$ which is designed to be received in the notch or detent 12 that may be easily formed by a chisel or other tool in the adjacent fish plate 13. The member 1$^a$ in this form of the device is also preferably coiled upon itself as indicated at 14 and is formed at its extremity with an inwardly projecting tooth or detent 7ª corresponding in function to the tooth 7 and designed to engage the teeth 10ª of the nut 5ª. It is to be noted that the member 2ª is formed with a bowed portion designated 9ª and serving the same function as the bowed portion 9 of the member 2 above described. It is to be understood that this form of the invention is not limited to any specific means for preventing the rotation of the bolt or for preventing the turning of the clip. For instance the lug 6ª may be entirely dispensed with if the member 2ª lies upon the base flange of a fish plate, as manifestly this will prevent the clip from turning.

From the foregoing description in connection with the accompanying drawing, the operation of my improved nut lock will be apparent. In the practical use of the device the nut is received between the members of the clip and slipped on the bolt and may be turned by hand until the threads catch. A continued movement of the nut may be easily effected until the tension is placed on the inner member of the clip to straighten out the bowed portion thereof, as the locking tooth or detent of the clip will remain out of operative relation to the toothed face of the nut until this tension has been produced. At such time, however, it is obvious that the straightening out of the normally bowed portion of the clip will result in drawing the tooth into operative relation to the teeth of the nut and the nut will be securely locked and effectually prevented from any accidental loosening.

In order to remove the nut, it is obviously only necessary to drive a wedge in between the outer member of the clip and the nut so as to release the tooth of the clip, but as various tools may be devised for this purpose, and as the same can form no part of the present invention, I have omitted any showing or specific description thereof.

Having thus described the invention, what is claimed as new is:

1. A nut lock comprising a spring clip embodying members adapted to embrace the nut, one of said members being formed with a locking tooth and the other with a bowed portion, for the purpose specified.

2. The combination with a bolt, of a nut mounted thereon, of a spring clip embodying members embracing the nut, one of said members being formed with a tooth engaging the nut and the other member being provided with an initially formed bowed portion held under tension by the nut and arranged to draw the tooth into engagement with the nut.

In testimony whereof I affix my signature in presence of two witnesses.

FREDERICK HARDY. [L. S.]

Witnesses:
 ROBT. J. McGAVOCK,
 W. J. HOWARD.